(12) United States Patent
Bargury et al.

(10) Patent No.: US 11,783,049 B2
(45) Date of Patent: Oct. 10, 2023

(54) AUTOMATED CODE ANALYSIS TOOL

(71) Applicant: Microsoft Technology Licensing, LLC, Redmond, WA (US)

(72) Inventors: Michael Zeev Bargury, Givat Shmuel (IL); Gal Malka, Tel Aviv (IL); Pnina Weiss, Tel Aviv (IL); Efim Hudis, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 324 days.

(21) Appl. No.: 17/007,025

(22) Filed: Aug. 31, 2020

(65) Prior Publication Data

US 2022/0067170 A1    Mar. 3, 2022

(51) Int. Cl.
*G06F 21/57* (2013.01)
*G06F 8/75* (2018.01)
*G06F 9/445* (2018.01)

(52) U.S. Cl.
CPC ............. *G06F 21/577* (2013.01); *G06F 8/75* (2013.01); *G06F 9/44505* (2013.01)

(58) Field of Classification Search
None
See application file for complete search history.

(56) References Cited

U.S. PATENT DOCUMENTS

| | | | |
|---|---|---|---|
| 2003/0009536 A1* | 1/2003 | Henderson | G06Q 10/10 709/219 |
| 2003/0018786 A1* | 1/2003 | Lortz | H04L 41/28 709/226 |
| 2007/0016583 A1* | 1/2007 | Lempel | G06F 21/6227 707/999.009 |
| 2012/0023553 A1* | 1/2012 | Berg | G06F 21/577 726/4 |
| 2012/0102474 A1* | 4/2012 | Artzi | G06F 21/577 717/157 |
| 2014/0366147 A1* | 12/2014 | Livshits | G06F 21/629 726/26 |
| 2018/0121659 A1* | 5/2018 | Sawhney | G06F 21/566 |

OTHER PUBLICATIONS

"International Search Report and Written Opinion Issued in PCT Application No. PCT/US21/034661", dated Sep. 16, 2021, 11 Pages.

* cited by examiner

*Primary Examiner* — William J. Goodchild
(74) *Attorney, Agent, or Firm* — Wade IP Law PLLC (57) ABSTRACT

An automatic code analysis tool is disclosed. The automatic code analysis tool can automatically analyze an application code of a subject application and application-specific additional information of a resource used by the subject application. The automatic code analysis tool can implement a method to receive the application code for analysis. A determination is made as to how application-specific information from resources operably coupled to the application code is implemented via the application code. The determination is performed with an automatic analysis without running the application code.

20 Claims, 4 Drawing Sheets

AUTOMATED CODE ANALYSIS TOOL

BACKGROUND

Automated code analysis tools automatically analyze the behavior of computer programs regarding a property such as correctness, robustness, safety, security, and liveness. In many examples, automated code analysis tools can focus on multiple areas include improving a program's performance while reducing resources and on ensuring the program behaves as expected. Automated coded analysis tools can analyze the behavior of programs without executing the program, such as in static program analysis, analyze the behavior of programs during runtime, such as dynamic program analysis, or in a combination of both. Automated code analysis tools can be included in integrated development environments, or IDEs, or as stand-alone products and available as software, hardware, or a combination of both.

SUMMARY

This summary is provided to introduce a selection of concepts in a simplified form that are further described below in the Description. This summary is not intended to identify key features or essential features of the claimed subject matter, nor is it intended to be used to limit the scope of the claimed subject matter.

The present disclosure is directed to an automated code analysis tool. The automatic code analysis tool can automatically analyze an application code of a subject application and application-specific additional information of a resource used by the subject application. The automatic code analysis tool can implement a method to receive the application code for analysis. A determination is made as to how application-specific information from resources operably coupled to the application code is implemented via the application code. The determination is performed with an automatic analysis without running the application code. In one example, the automatic code analysis tool can implement a method to receive the application code for analysis. The application code is analyzed in an application-specific context by querying an associated identity manager to verify user identity and user access of the application code. Also, a security status of resources accessed with the application code is analyzed.

BRIEF DESCRIPTION OF THE DRAWINGS

The accompanying drawings are included to provide a further understanding of embodiments and are incorporated in and constitute a part of this disclosure. The drawings illustrate embodiments and together with the description serve to explain principles of embodiments. Other embodiments and many of the intended advantages of embodiments will be readily appreciated, as they become better understood by reference to the following description. The elements of the drawings are not necessarily to scale relative to each other. Like reference numerals designate corresponding similar parts.

DESCRIPTION

In the following Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following description, therefore, is not to be taken in a limiting sense. It is to be understood that features of the various example embodiments described herein may be combined, in part or whole, with each other, unless specifically noted otherwise.

Figure 1:
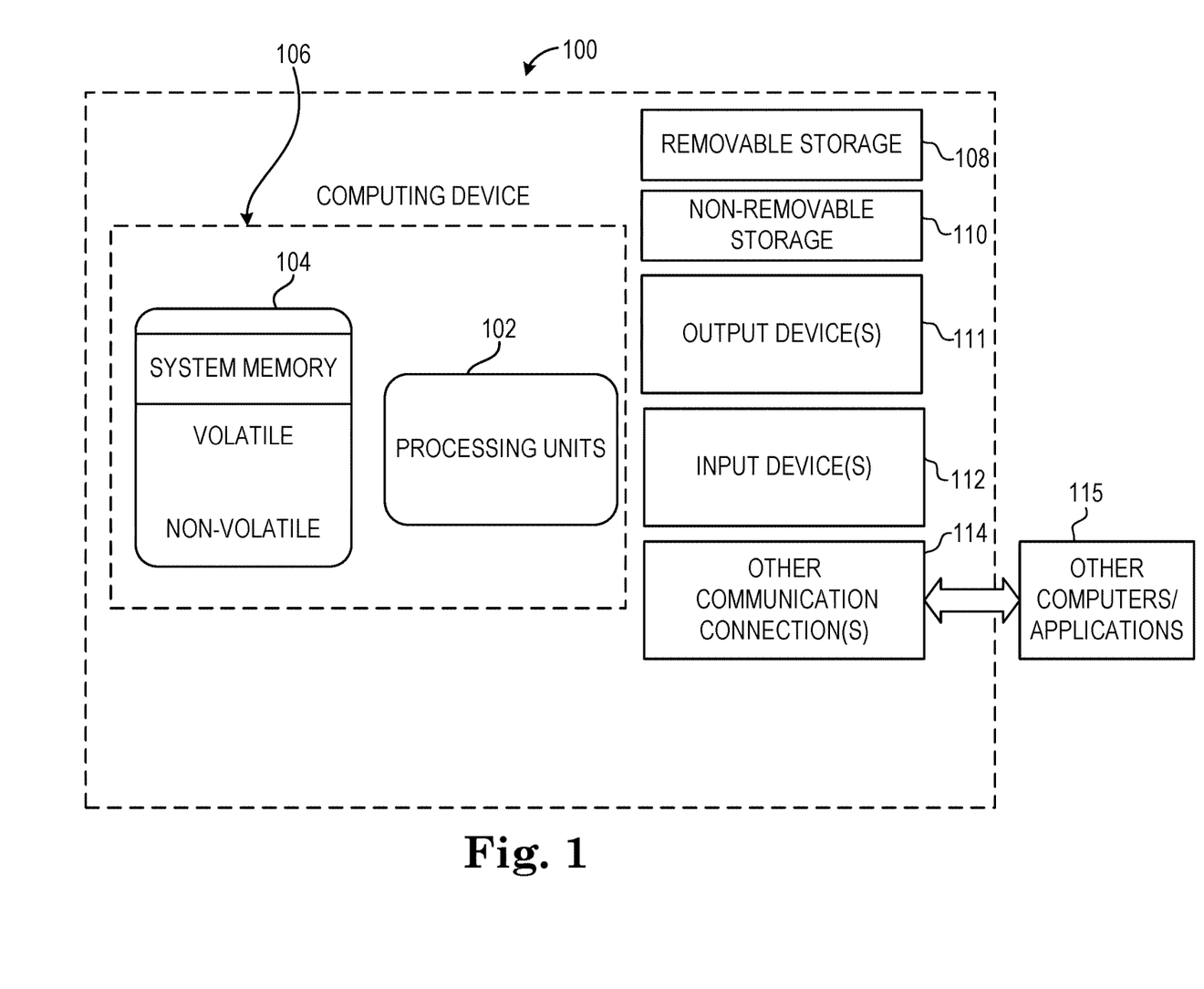
FIG. 1 is a block diagram illustrating an example of a computing device, which can be configured in a computer network to provide, for example, a cloud-computing environment.

FIG. 1 illustrates an exemplary computer system that can be employed in an operating environment and used to host or run a computer application included on one or more computer readable storage mediums storing computer executable instructions for controlling the computer system, such as a computing device, to perform a process. The exemplary computer system includes a computing device, such as computing device 100. The computing device 100 can take one or more of several forms. Such forms include a tablet, a personal computer, a workstation, a server, a handheld device, a consumer electronic device (such as a video game console or a digital video recorder), or other, and can be a stand-alone device or configured as part of a computer network.

In a basic hardware configuration, computing device 100 typically includes a processor system having one or more processing units, i.e., processors 102, and memory 104. By way of example, the processing units may include two or more processing cores on a chip or two or more processor chips. In some examples, the computing device can also have one or more additional processing or specialized processors (not shown), such as a graphics processor for general-purpose computing on graphics processor units, to perform processing functions offloaded from the processor 102. The memory 104 may be arranged in a hierarchy and may include one or more levels of cache. Depending on the configuration and type of computing device, memory 104 may be volatile (such as random access memory (RAM)), nonvolatile (such as read only memory (ROM), flash memory, etc.), or some combination of the two.

Computing device 100 can also have additional features or functionality. For example, computing device 100 may also include additional storage. Such storage may be removable or non-removable and can include magnetic or optical disks, solid-state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other storage medium that can be used to store the desired information and that can be accessed by computing device 100. Accordingly, a propagating signal by itself does not qualify as storage media. Any such computer storage media may be part of computing device 100.

Computing device 100 often includes one or more input and/or output connections, such as USB connections, display ports, proprietary connections, and others to connect to various devices to provide inputs and outputs to the computing device. Input devices 112 may include devices such as keyboard, pointing device (e.g., mouse, track pad), stylus, voice input device, touch input device (e.g., touchscreen), or other. Output devices 111 may include devices such as a display, speakers, printer, or the like.

Computing device 100 often includes one or more communication connections 114 that allow computing device 100 to communicate with other computers/applications 115. Example communication connections can include an Ethernet interface, a wireless interface, a bus interface, a storage area network interface, and a proprietary interface. The communication connections can be used to couple the computing device 100 to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, the internet, or other network.

Cloud computing is a model of service delivery for enabling convenient, on-demand network access to a shared pool of configurable computing resources that can be rapidly generated and released with nominal management effort or interaction with a provider of the service. Cloud computing allows a cloud consumer to obtain computing resources, such as networks, network bandwidth, servers, processing memory, storage, applications, virtual machines, and services as a service on an elastic and sometimes impermanent basis. Cloud computing platforms and infrastructures allow developers to build, deploy, and manage assets and resources for applications. Cloud computing may include security services that can protect resource and assets from attack. A multi-tenant cloud is a cloud computing architecture that allows customers to share computing resources in a public or private cloud. Each tenant's data can be isolated and remain invisible to other tenants.

In one example, one or more of computing devices 100 can be configured as servers in a datacenter to provide distributed computing services such as cloud computing services. A data center can provide pooled resources on which customers or tenants can dynamically provision and scale applications as needed without having to add servers or additional networking. The datacenter can be configured to communicate with local computing devices such used by cloud consumers including personal computers, mobile devices, embedded systems, or other computing devices. Within the data center, computing device 100 can be configured as servers, either as stand alone devices or individual blades in a rack of one or more other server devices. One or more host processors, such as processors 102, as well as other components including memory 104 and storage 110, on each server run a host operating system that can support multiple virtual machines. A tenant may initially use one virtual machine on a server to run an application. The datacenter may activate additional virtual machines on a server or other servers when demand increases, and the datacenter may deactivate virtual machines as demand drops.

Datacenter may be an on-premises, private system that provides services to a single enterprise user or may be a publicly (or semi-publicly) accessible distributed system that provides services to multiple, possibly unrelated customers and tenants, or may be a combination of both. Further, a datacenter may be a contained within a single geographic location or may be distributed to multiple locations across the globe and provide redundancy and disaster recovery capabilities. For example, the datacenter may designate one virtual machine on a server as the primary location for a tenant's application and may activate another virtual machine on the same or another server as the secondary or back-up in case the first virtual machine or server fails.

A cloud-computing environment is generally implemented in one or more recognized models to run in one or more network-connected datacenters. A private cloud deployment model includes an infrastructure operated solely for an organization whether it is managed internally or by a third-party and whether it is hosted on premises of the organization or some remote off-premises location. An example of a private cloud includes a self-run datacenter. A public cloud deployment model includes an infrastructure made available to the general public or a large section of the public such as an industry group and run by an organization offering cloud services. A community cloud is shared by several organizations and supports a particular community of organizations with common concerns such as jurisdiction, compliance, or security. Deployment models generally include similar cloud architectures, but may include specific features addressing specific considerations such as security in shared cloud models. In a private cloud, the customers, who are also called tenants, can be different business divisions inside the same company. In a public cloud, the customers are often entirely different organizations. Many public cloud providers use the multi-tenancy model. It allows them to run one server instance, which is less expensive and makes it easier to deploy updates to a large number of customers.

Cloud-computing providers generally offer services for the cloud-computing environment as a service model provided as one or more of an infrastructure as a service, platform as a service, and other services including software as a service. Cloud-computing providers can provide services via a subscription to tenants or consumers. For example, software as a service providers offer software applications as a subscription service that are generally accessible from web browsers or other thin-client interfaces, and consumers do not load the applications on the local computing devices. Infrastructure as a service providers offer consumers the capability to provision processing, storage, networks, and other fundamental computing resources where the consumer is able to deploy and run software, which can include operating systems and applications. The consumer generally does not manage the underlying cloud infrastructure, but generally retains control over the computing platform and applications that run on the platform. Platform as a service providers offer the capability for a consumer to deploy onto the cloud infrastructure consumer-created or acquired applications created using programming languages, libraries, services, and tools supported by the provider. In some examples, the consumer does not manage or control the underlying cloud infrastructure including network, servers, operating systems, or storage, but has control over the deployed applications and possibly configuration settings for the application-hosting environment. In other examples, the provider can offer a combination of infrastructure and platform services to allow a consumer to manage or control the deployed applications as well as the underlying cloud infrastructure. Platform as a service providers can include infrastructure, such as servers, storage, and networking, and also middleware, development tools, business intelligence services, database management services, and more, and can be configured to support the features of the application lifecycle including one or more of building, testing, deploying, managing, and updating.

Code analysis tools can be implemented in a number of configurations including standalone applications, as part of a suite of programs, either resident on a computing device configured to analyze, which can include to test and review, a subject application or as part of a service, such as a cloud application, configured to analyze, which can include to test and review, an application code of a subject application. In one example, analysis tools can be directed at analyzing the internal structures of the subject application such as in glass box testing, the functionality of the subject application such as in black-box testing, or both. Static analysis techniques do not execute the subject application. For example, static analysis techniques can correct descriptions, specification, and representations of the subject application and can cover lexical analysis of the program syntax and investigate the structure and usage of statements. Static analysis is performed automatically with the aid of a software tool including parsers, data flow analyzers, and syntax analyzers. Automatic static analysis techniques can include static verification, syntax parser, and symbolic execution. For example, a syntax parser, which splits the subject application text into individual statements, is an elementary automatic static analysis tool. Automatic static analysis, as used in this disclosure, does not include manual techniques for testing that do not execute the subject application. Such manual techniques include program inspection and program walk-through. Automatic static analysis is also contrasted from dynamic analysis in which is the analysis of the behavior of the subject application before, during, and after execution in an artificial or real application environment. Some analysis tools can include both automatic static analysis and dynamic analysis in which automatic static analysis techniques are applied to the application code, which does not execute the subject application, and dynamic analysis techniques are applied to the executed subject application in a runtime. Examples of tools that include both automatic static analysis and dynamic analysis include concolic analysis tools and interactive analysis tools, which in one example can be applied in glass box testing. Examples of automatic concolic analysis tools include Satisfiability Modulo Theories (SMT) Solvers.

Automatic static analysis tools analyze the subject application, or, more particularly, the code of the subject application, i.e., application code, in a general context. For example, the rules of the automatic static analysis techniques generally apply to each subject application under analysis. Once the rules of the automatic static analysis techniques are set, the rules are applied to subject applications under analysis. In some circumstances, the automatic static analysis techniques may apply outside resources, such as access to a set of previously identified open source dependencies or a set of known information-security vulnerabilities, such as Common Vulnerabilities and Exposures, or CVEs, the outside resources are applied to subject applications under analysis.

Figure 2:
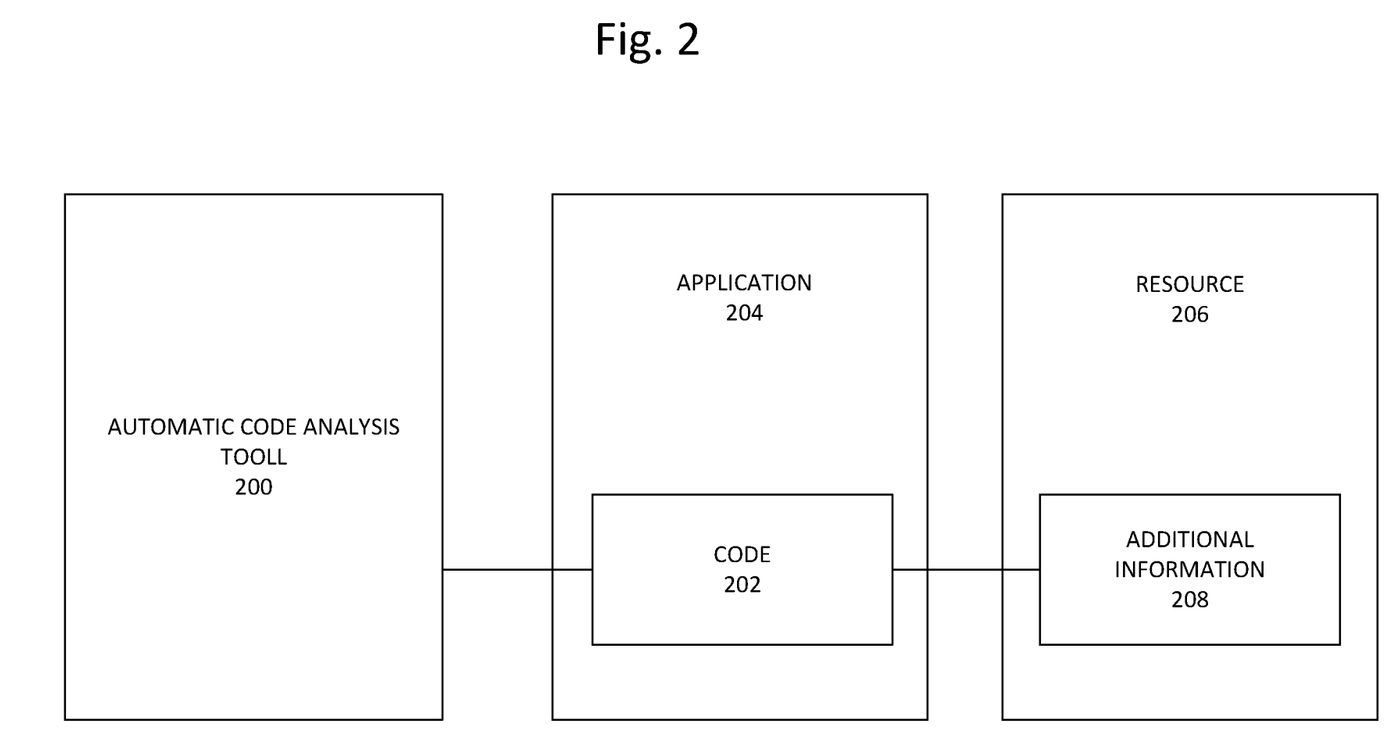
FIG. 2 is a block diagram illustrating an example an automatic code analysis tool that may automatically analyze application code of a subject application and application-specific additional information from resources used with the subject application, which automatic code analysis tool can be implemented to run on the computing device of FIG. 1.

FIG. 2 illustrates and example, automated code analysis tool 200 that can provide an application-specific analysis of application code 202 of a subject application 204. In the example, automated code analysis tool can be implemented as a computer readable storage device to store computer executable instructions to control a processor, such as processor 102 of computing device 100, to perform a method of automatically analyzing application code 202 of the subject application 204. The computer readable storage device can be deployed on a computer device, such as in a memory 104 of computing device 100, which also stores the application code 202. In another example, the computer readable storage device can be accessible over a network by a computing device including the application code 202. In still other examples, the computer readable storage device may be included in a datacenter to which the computing device including the application code 202 has access via a subscription to a service, such as a cloud service. For instance, the automated code analysis tool 200 may be deployed as a network application, such as a web application, that may be scalable to the demands of a multiplicity of subject applications, such as subject application 204.

The application code 202 implements a resource 206, which can include resources and services, as part of the functionality the subject application 204. The resource 206 includes application-specific additional information 208, which is determined from an analysis of the application code 202. In one example, application-specific additional information 208 can include identity and user access information from an associated identity manager included as resource 206. In another example, application-specific additional information 208 can include security status of resources accessed with the application code as included as resource 206.

In the example, the automatic code analysis tool 200 provides an application-specific analysis of application code 202 based on the application code 202 and application-specific additional information 208. The application code 202 and application-specific additional information 208 are analyzed without the executing the subject application 204 or the resource 206, which is similar to static analysis techniques. Automatic code analysis, such as automatic application-specific analysis based on the application code 202 and the application-specific resource 206 is performed with the testing tool 200 using a processor and not via manual techniques, which is also similar to automatic static analysis.

Figure 3:
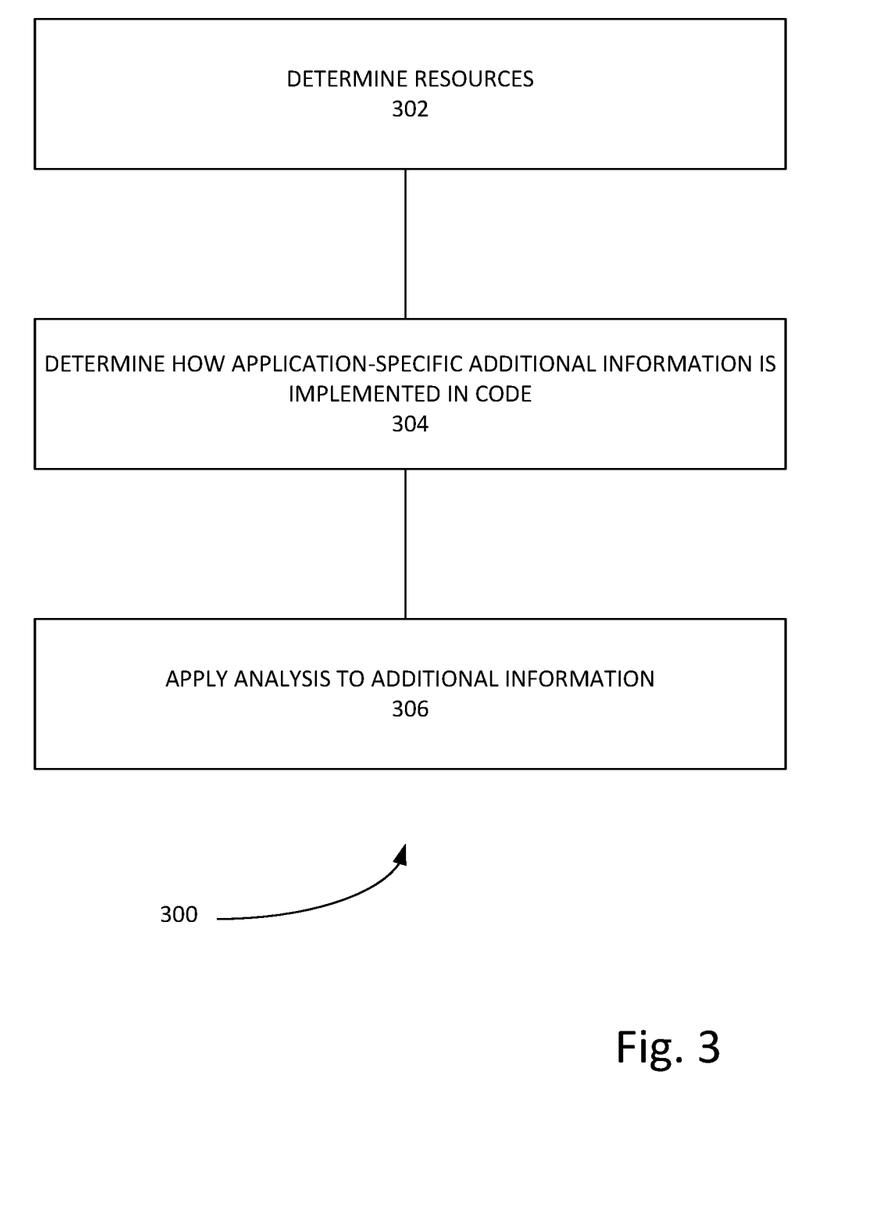
FIG. 3 is a block diagram illustrating an example method of the automatic code analysis tool of FIG. 2.

FIG. 3 illustrates a method 300 that can be implemented with the automatic code analysis tool 200. In one example, the method 300 can be implemented as a computer readable storage device to store computer executable instructions to control a processor, such as processor 102 of computing device 100, to perform a method of automatically analyzing application code 202 of the subject application 204 and application-specific additional information 208. The method 300 analyzes application code 202 and application-specific additional information 208 are analyzed without the executing the subject application 204 or the resource 206. For example, the method can determine resources 206 from the application code 202 at 302, and how the application-specific additional information 208 is implemented in application code 202 at 304. The method 300 can apply analysis techniques to the application-specific additional information 208 of the resources 206 at 306. In one example, the method 300 and automatic code analysis tool 200 is given access to the resources 206 of the subject application 204 as well as the application code 202. The analysis techniques applied to the application-specific information 208 can include automatic static analysis techniques as well as a verification that the resources 206 are available to provide the application-specific additional information 208. An example of an analysis technique applied to the application-specific information can include a verification of the security status, such as whether the resource 206 is secured, or a determination as to the security configuration of the resource 206, such as whether the resource 206 is misconfigured.

In one example, the method 300 can be performed on the application code 202 concurrently or sequentially with a static analysis of the application code 202. For example, an automatic static analysis tool can be incorporated within the automatic code analysis tool 200. Furthermore, a dynamic analysis tool and an automatic static analysis tool can be incorporated within the automatic code analysis tool 200 to perform a dynamic analysis of the subject application. In one example, a failed automatic static analysis of the application code can be addressed with a code patch, but a failed analysis of the automatic code analysis tool 200 or by method 300 can be addressed with a change to the application code 202 or a change to the configuration of the resource 206.

Figure 4:
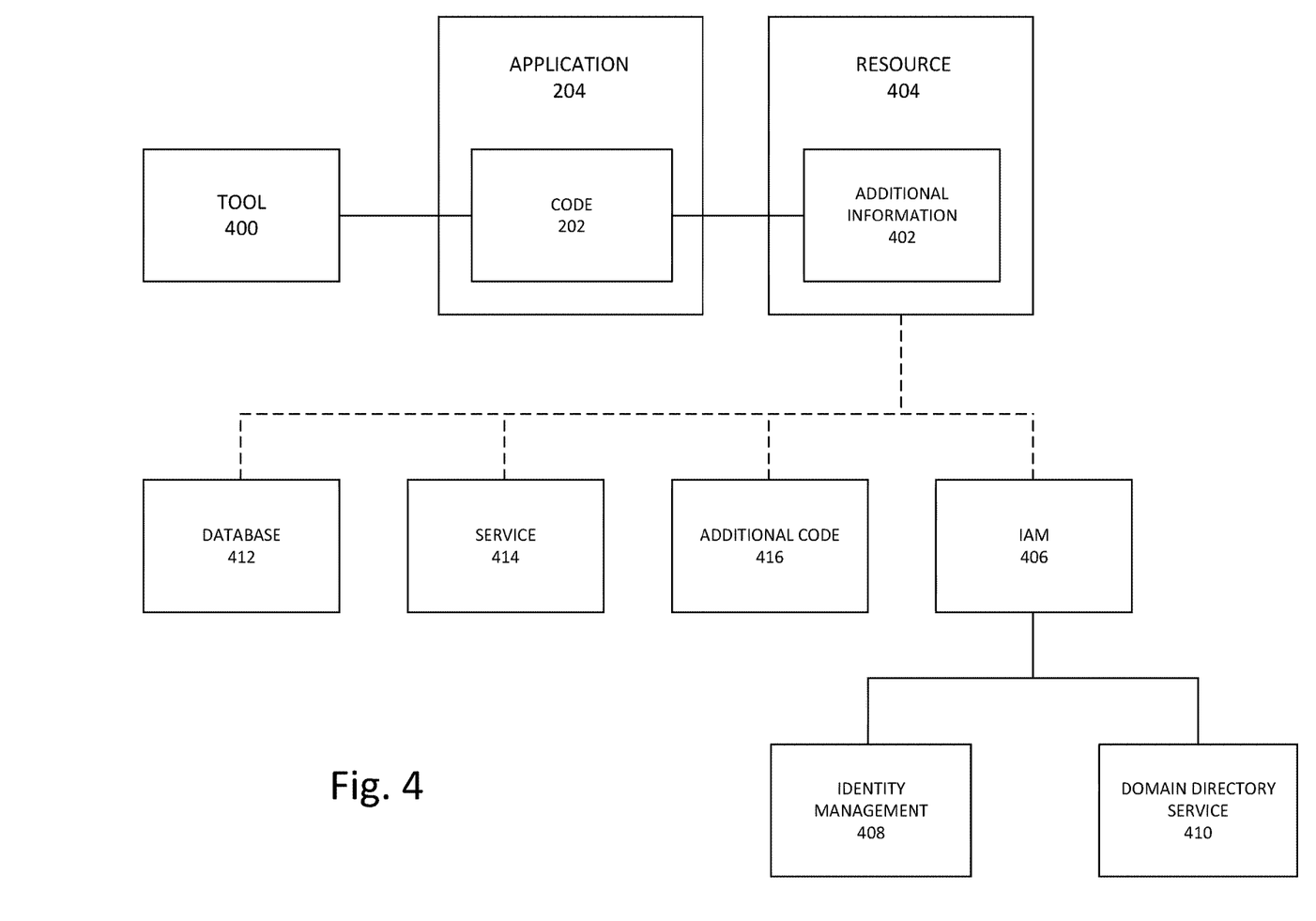
FIG. 4 is a block diagram illustrating an example implementation of the automatic code analysis tool of FIG. 2.

FIG. 4 illustrates an automated code analysis tool 400 that can implement method 300 of the automatic code analysis tool 200. In one example, the automated code analysis tool 400 can be implemented as a computer readable storage device to store computer executable instructions to control a processor, such as processor 102 of computing device 100, to perform a method of automatically analyzing application code 202 of the subject application 204 and application-specific additional information 402. The automated code analysis tool 400 applies method 300 to analyze application code 202 and application-specific additional information 402 are analyzed without the executing the subject application 204 or resource 404. In one example, resource 404 can include one or more of a plurality of resources. For example, resource 404 can include an identity or access management resource 406, such as an identity management system 408 or a domain directory service 410. In this example, the application code 202 can define a user group such as an administrator group. In one example, the method 300 can apply analysis techniques to the application-specific additional information 402 related to the identity context of the resources 406, such as at 306, to determine whether the user group is properly defined. In another example, of the identity or access management resource 406, the application code 202 can apply a particular identity to access a particular resource. In one example, the method 300 can apply analysis techniques to the application-specific additional information 402 related to the identity context of the resources 406, such as at 306, to determine whether the particular identity has access to the particular resource.

Identity and access management, which is often used interchangeably with identity management, includes a framework of policies and technologies to connect appropriate entities with technology resources. An entity can include a sub-entity of an entity such as an individual of an enterprise. An identity management system can identify, authenticate, and authorize entities to use resources such as access to hardware and software. Identity management systems can include features to provide identity to an entity, the roles and permissions of an identity with respect to resources, the protection of the identity, and the technologies that support the protection, including protocols, digital certificates and passwords. In one example, identity management systems can integrate or be used with directory services for domains for identity synchronization, certificate management, user password management, and user provisioning from an interface.

A domain is a form of a computer network in which all user accounts, computers, printers and other security principals, are registered with a central database located on one or more clusters of central computers known as domain controllers. Authentication takes place on domain controllers. In one example, each user within a domain receives a unique user account that can then be assigned access to resources within the domain. A domain network can make sure of a domain directory service. In one example, a domain directory service is a type of database that can organize resources of the computer network and can provide authentication and authorization to applications file service, printers and other on-premises resources. A domain directory service or name service maps the names of network resources to their respective network addresses. The domain directory service is a shared information infrastructure for locating, managing, administering and organizing everyday items and network resources, which can include volumes, folders, files, printers, users, groups, devices, telephone numbers and other objects. The domain directory service can consider each resource on the network an object. Information about a particular resource is stored as a collection of attributes associated with that resource or object.

One example of a domain directory service is available under the trade designation Active Directory Domain Service from Microsoft, Corporation, or Redmond, Washington. An example domain directory service can authorize all users and computers in a domain type network, which can include assigning and enforcing security policies for all computers and installing or updating software. For example, when a user logs into a computer that is part of the domain, the domain directory service checks the submitted password and determines whether the user is a system administrator or normal user. Also, it allows management and storage of information, provides authentication and authorization mechanisms, and establishes a framework to deploy other related services such as Certificate Services, Federated Services, Lightweight Directory Services and Rights Management Services.

Still further, resource 404 can include a database 412. In this example, the application code 202 can access data stored in the database 412. In one example, the method 300 can apply analysis techniques to the application-specific additional information 402 related to database 412, such as at 306, to determine whether the database 412 is secured or unsecured. Similarly, resource 404 can include a third-party service 414 with which the application code 202 can be integrated or associated, or operably coupled. The method 300 can apply analysis techniques to the application-specific additional information 402 related to third-party service 414, such as at 306, to determine whether security configurations of the service 414 are configured or misconfigured. Additionally, resource 404 can be code 416 developed by a third party that is included or associated with the application code 202. In one example, the method 300 can apply analysis techniques to the application-specific additional information 402 related to third party code 416, such as at 306, to determine the owner of the code 416 or whether the code 416 is overseen by the owner of application code 202 or another owner. In one example the application-specific additional information 402 can include metadata. Resources can also include code repositories, organizational hierarchies, and developer pipelines.

The automatic code analysis tools 200, 400 and method 300, can be included as a service in a cloud environment or part of a service in the cloud environment and implemented on a computing device 100 in a datacenter. The example automatic code analysis tools 200, 400 can be implemented to include a combination of one or more hardware devices and computer programs for controlling a system, such as a computing system having a processor and memory, to perform method 300. For instance, automatic code analysis tools 200, 400, can be implemented as a computer readable medium or computer readable storage device having set of executable instructions for controlling the processor to perform the method 300.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A method, comprising:
receiving application code for analysis;
determining how application-specific information from a resource that is operably coupled to the application code is implemented via the application code by performing an automatic analysis of the application code without running the application code;
determining a security status of the resource or a security configuration of the resource by performing an automatic analysis of the application-specific information without executing the resource; and
implementing a change to a configuration of the resource based on the security status of the resource or the security configuration of the resource as a result of performing the automatic analysis of the application-specific information without executing the resource.

2. The method of claim 1, wherein performing the automatic analysis of the application code comprises:
analyzing an application-specific context of the application code by querying an associated identity manager to verify user identity and user access of the application code.

3. The method of claim 2, wherein the analyzing the application specific context of the application code includes determining whether a user group is properly defined.

4. The method of claim 1, wherein determining the security status of the resource or the security configuration of the resource comprises: determining the security status of a database storing data accessed by the application code.

5. The method of claim 1, wherein the resource is a service operably coupled to the application code.

6. The method of claim 1, wherein determining the security status of the resource or the security configuration of the resource comprises:
determining the security configuration of the resource.

7. The method of claim 1, wherein determining the security status of the resource or the security configuration of the resource comprises:
determining an owner of the resource.

8. The method of claim 7, wherein determining the owner of the resources comprises:
determining whether the owner of the resource owns the application code.

9. The method of claim 1, comprising:
implementing the change to the configuration of the resource and implementing a change to the application code based on the security status of the resource or the security configuration of the resource as a result of performing the automatic analysis of the application-specific information without executing the resource.

10. The method of claim 1, further comprising:
verifying that the resource is available to provide the application-specific information;
wherein determining the security status of the resource or the security configuration of the resource is performed in response to verifying that the resource is available to provide the application-specific information.

11. A computer readable storage device to store computer executable instructions to control a processor to:
receive application code for analysis;
determine how application-specific information from a resource that is operably coupled to the application code is implemented via the application code by performing an analysis without running the application code;
determine a security status of the resource or a security configuration of the resource by performing an analysis of the application-specific information without executing the resource; and
implement a change to a configuration of the resource based on the security status of the resource or the security configuration of the resource as a result of performing the analysis of the application-specific information without executing the resource.

12. The computer readable storage device of claim 11, wherein the application-specific information includes identity and access management information.

13. The computer readable storage device of claim 12, wherein the identity and access management information pertains to a user group; and
wherein the computer executable instructions are to control the processor to:
determine whether the user group is properly defined.

14. The computer readable storage device of claim 11, wherein the computer executable instructions are to control the processor to: determine the security status of the resource by performing the analysis of the application-specific information without executing the resource.

15. The computer readable storage device of claim 11, wherein the computer executable instructions are to control the processor to:
determine the security configuration of the resource by performing the analysis of the application-specific information without executing the resource.

16. The computer readable storage device of claim 15, wherein the application-specific information includes metadata.

17. A system, comprising:
a memory device to store a set of instructions; and
a processor to execute the set of instructions to:
receive application code for analysis;
determine how application-specific information from a resource that is operably coupled to the application code is implemented via the application code by performing an automatic analysis of the application code without running the application code;
determine a security status of the resource or a security configuration of the resource by performing an automatic analysis of the application-specific information without executing the resource; and implement a change to a configuration of the resource based on the security status of the resource or the security configuration of the resource as a result of performing the automatic analysis of the application-specific information without executing the resource.

18. The system of claim 17, wherein the instructions are implemented in an automatic code analysis tool that is configured to provide automatic static analysis of the application code.

19. The system of claim 17, wherein the processor is to execute the set of instructions to:

implement the change to the configuration of the resource and implementing a change to the application code, based on the security status of the resource or the security configuration of the resource, as a result of performing the automatic analysis of the application-specific information without executing the resource.

20. The system of claim 17, wherein the resource includes a database.

\* \* \* \* \*